June 19, 1962 T. G. ABBOTT 3,039,197

TAPE CONSTRUCTIONS FOR USE IN LAYING OUT CROQUET COURTS

Filed March 27, 1958

INVENTOR
TILDEN G. ABBOTT

BY

Chauncey M. Sincerbeaux
ATTORNEY

United States Patent Office 3,039,197 Patented June 19, 1962

3,039,197

TAPE CONSTRUCTIONS FOR USE IN LAYING OUT CROQUET COURTS

Tilden G. Abbott, 35 Stancliff Road, Glastonbury, Conn.

Filed Mar. 27, 1958, Ser. No. 724,403
1 Claim. (Cl. 33—98)

This invention relates to tape constructions for use in laying out croquet courts or grounds.

Different authorities differ in their ideas as to what the dimensions of a regulation or standard croquet court should be and as to the proper locations, on the court, of certain of the elements such as the wickets and stakes and the proper positions of certain of these elements with relation to each other. No one of the layouts proposed by these authorities can be properly regarded as "regulation" or "standard."

On account of the number of elements to be located in predetermined positions on the court and in predetermined relation to each other, in the laying out of a croquet court accurately in accordance with any one of the layouts proposed by these authorities, the laying out of a court in each case involves a considerable amount of labor and time as well as some mechanical skill. For these reasons, croquet courts are often laid out in a "hit and miss" fashion and the resultant courts are far from following the lines proposed by any one of the authorities.

The object of the present invention is to produce a tape construction for use in laying out croquet courts which will enable a court having the usual wickets and stakes to be quickly and easily laid out with the wickets and stakes in predetermined positions on the court and in predetermined positions with relation to each other in accordance with a predetermined layout plan.

With the above and other objects in view, the invention consists in the tape constructions embodying the novel and improved features hereinafter described and particularly pointed out in the claim, the advantages of which will be readily understood and appreciated by those skilled in the art.

The invention will be clearly understood from the accompanying drawing illustrating tape constructions embodying the several features of the invention in their preferred forms and the following detailed description of the constructions therein shown.

The laying out tape construction of the present invention comprises a plurality of sections or lengths of tape connected together to produce a combination by which a croquet court may be quickly and easily laid out to the measurements desired with a high degree of accuracy. The tape employed in making the tape construction may be a relatively heavy, strong, woven cotton tape of suitable width. Any other tape found suitable for the purpose, however, may be used.

Figure 1:
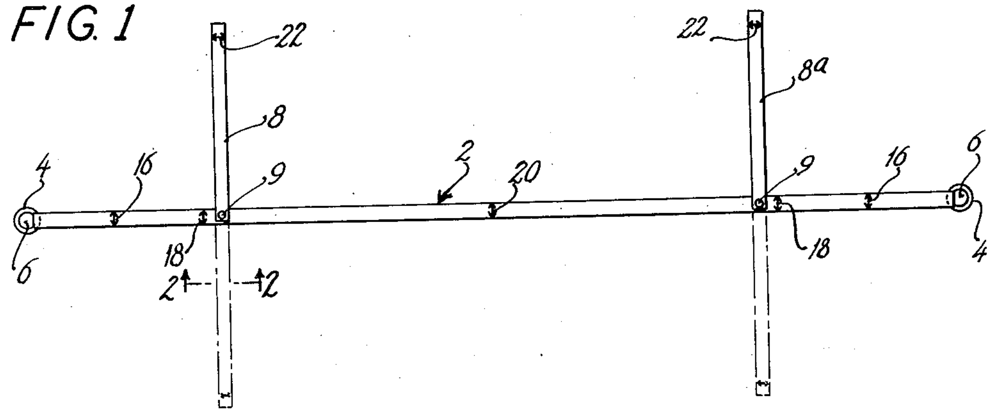
FIG. 1 is a plan view of a tape construction embodying certain features of the invention and constructed for laying out croquet grounds of a selected size.
Figure 4:
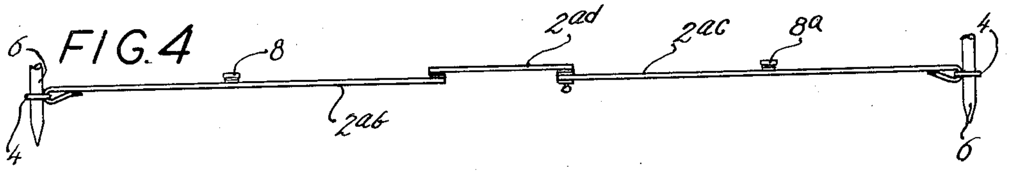
FIG. 4 is a view in front elevation of the tape construction shown in FIG. 3.

In the tape construction shown in FIG. 1, the tape comprises a longitudinal tape member or tape indicated at 2 having a predetermined length substantially the same as the proposed distance between stakes. To each end of this tape member is secured a ring 4. Each ring is suitably attached to the corresponding end portion of the tape member 2, and it may be so connected by passing its corresponding end portion through the ring and folding the same back into engagement with the portion of the tape member nearer the longitudinal center thereof, as shown in FIG. 4 and securing the same to the latter portion in any suitable manner. Each ring is of a size to enable a conventional croquet stake, indicated at 6, to be passed readily through the same as shown in FIG. 4.

Figure 2:
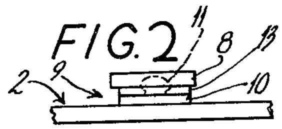
FIG. 2 is a detail elevational view taken in the direction of the arrows 2—2 in FIG. 1.

The tape construction also comprises two side tape members or tapes, respectively indicated at 8 and 8*a*, for determining the positions of the side wickets longitudinally of the court and the distance of said wickets from the longitudinal center line of the court. Each of these side tapes is connected at its inner end to the longitudinal tape member 2. These side tape members are connected to the longitudinal tape member respectively at points on opposite sides of the central point of the longitudinal tape member and at equal distances from the ends of said longitudinal tape member. Each side tape is adapted to be extended from said longitudinal tape 2 and perpendicularly to the center line thereof either into a position at one side of said center line or at the other side thereof. Each side tape member is preferably connected detachably to the longitudinal tape member, and it is shown as being so connected by a snap fastener 9 shown in FIG. 2. As indicated in detail in FIG. 2, the snap fastener comprises a support 10 secured to the longitudinal tape member 2 and a stud 11 mounted on said support and projecting upwardly from said longitudinal tape member. The snap fastener also includes a socket 13 secured to each side tape member 8 and 8*a*, this socket having a recess to receive the stud 11 and spring acting detents (not shown) to engage the stud, when the stud is inserted in the recess, and to restrain the withdrawal of the stud therefrom. This construction enables each side tape member 8 or 8*a* to be pivoted about the axis of the stud 11 of the corresponding snap fastener to enable said tape member 8 or 8*a* to be located alternatively on opposite sides of the longitudinal tape member 2.

With this construction, each side tape 8 or 8*a* may be located first in one position on one side of the longitudinal center line of the court as shown in full lines in FIG. 1 to locate the corresponding side wicket in the proper position and then may be located in a second position on the other side of the longitudinal center line of the court as shown in dot and dash lines in FIG. 1 to locate the other corresponding side wicket in the proper position. The attaching of the side tapes detachably to the longitudinal tape also renders the side tapes interchangeable and enables the tape construction to be used with only one side tape member.

The tape members are provided with marks to indicate the positions of the several wickets. These marks may consist of narrow bands of paint extending in directions transversely of the several tape members. The longitudinal tape member 2 is provided with marks 16 to indicate the positions of the end wickets nearer the stakes 6, 6 at each end of the court, with marks 18 to indicate the positions of the end wickets farther from the stake at each end of the court and with a mark 20 to indicate the position of the center wicket.

Each of the side tapes is provided with a mark 22 to indicate successively, in the alternative positions of the side tape, the positions of the two side wickets on opposite sides of the center line of the court.

In the use of the tape construction shown in FIG. 1, in laying out a croquet court, a plot is selected which is of sufficient length so that the court will extend several feet outwardly beyond the end stakes at each end of the court and which is of sufficient width so that the court will extend several feet outwardly beyond the side wickets at each side of the court. The tape construction shown in FIG. 1 comprising the longitudinal tape member 2 and the two side tape members 8, 8*a* each attached at its inner end to the longitudinal tape member is applied to the plot so that the longitudinal tape member 2 extends longitudinally of the plot centrally thereof and the ends of the longitudinal tape member are in positions such that the marginal portion of the court extends longitudinally of the court several feet beyond the stakes at each end. The longitudinal tape member is stretched taut in this position and is held in place by the insertion of the stakes 6, 6 through the rings 4 and the driving of the stakes some distance into the ground. The end wickets then may be inserted into the ground over the marks 16 and 18 on the opposite end portions of the longitudinal tape member 2 and over the mark 20 at the longitudinal center of said tape member, the wickets straddling said tape member in each case.

After the longitudinal tape has been applied to the ground and secured in place as above described, one of the two side tape members, such as member 8, is adjusted preferably about the stud of the corresponding snap fastener 9, so as to locate said side member in an extended position with its center line substantially perpendicular to the median line of the tape member 2 as shown in full lines in FIG. 1. While held in this position, a side wicket is inserted in the ground by the side of the side tape member 8 with its center opposite the mark 22 on said member.

When one of the side wickets has been located accurately in the correct position by means of the side tape member 8, in the manner above set forth, the corresponding wicket on the opposite side of the longitudinal center line of the court is accurately located in correct position by means of this same side tape member. To enable the latter tape member to be used in locating the latter side wicket in the proper position, said member is adjusted, preferably about the stud of the corresponding snap fastener 9, into the position shown in dot and dash lines in FIG. 1 in which the center line of the side tape member 8 is substantially perpendicular to the median line of the longitudinal tape member 2. The side tape member 8 is held extended in this position and while it is held in place, the corresponding side wicket is inserted in the ground by the side of said tape member 8 with the center of the wicket in central position with relation to the mark 22.

The other two side wickets are located on the court by means of the other side tape member 8*a* by locating said tape member in extended position with its center line substantially perpendicular to the median line of the longitudinal tape member first on one side of the latter tape member and then on the other side of said latter tape member as shown respectively in full lines and in dot and dash lines in FIG. 1. In each position of the side tape member 8*a*, the corresponding side wicket is located by the mark 22 on said tape member and the wicket is inserted by the side of the tape member with its center opposite the mark.

After all of the wickets have been put in place, the end portions of the longitudinal tape 2 can be raised to lift the rings 4, 4 from the stakes 6, 6. Then the entire tape construction can be pulled endwise through all of the wickets located along the center line.

The tape construction shown in FIG. 1 is devised for use in the laying out of croquet courts of one length and of one width only. The tape construction shown in FIGS. 3, 4 and 5 is devised for use in the laying out of courts of either of two different lengths and courts of one width only.

Figure 3:
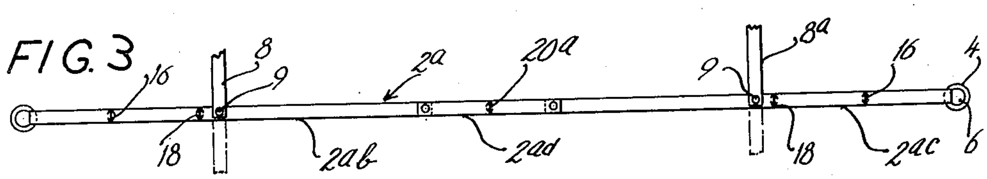
FIG. 3 is a plan view illustrating a tape construction embodying certain features of the invention and constructed for use in laying out croquet courts of either of two different lengths, the tape being shown as set up for laying out a court of the greater length.
Figure 5:
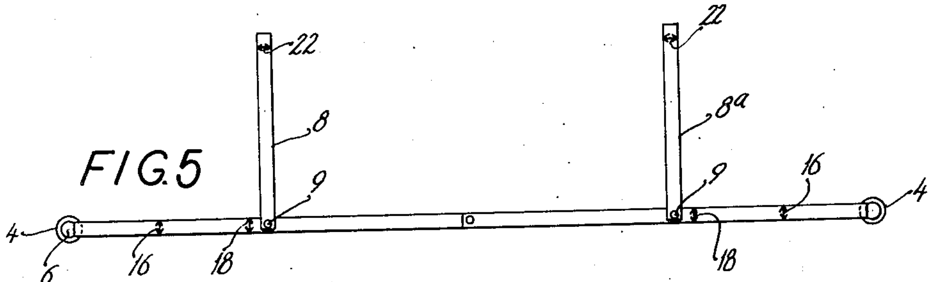
FIG. 5 is a plan view illustrating the tape construction shown in FIGS. 3 and 4 with one of the parts removed and the tape set up for the laying out of a court of the shorter length.

The tape construction shown in FIGS. 3, 4 and 5 is the same as that shown in FIG. 1 except for the longitudinal tape member. All of the corresponding parts shown in FIGS. 3, 4 and 5 are given the same reference numerals as in FIG. 1 and the longitudinal tape member in FIGS. 3, 4 and 5 is indicated as a whole at 2*a*.

Figure 6:
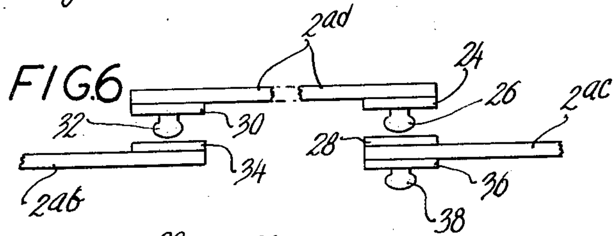
FIG. 6 is a detail view in front elevation on an enlarged scale illustrating certain parts of the tape construction shown in FIGS. 3, 4 and 5, with certain parts in relatively disconnected positions.

The longitudinal tape member 2*a* of the construction shown in FIGS. 3, 4 and 5 comprises two outer or end sections 2*ab* and 2*ac* of equal lengths, each extending from the ring 4 to a point at a predetermined distance from the longitudinal center of the longitudinal tape member, and a central section 2*ad* of predetermined length having its outer ends respectively detachably connected with the inner ends of said sections 2*ab* and 2*ac* by snap fasteners. FIG. 6 is a detail view showing the arrangement of the snap fastener members attached respectively to the inner ends of the tape sections 2*ab* and 2*ac* and the fastener members attached to the ends of the tape section 2*ad*.

The tape section 2*ad* is provided at one end with a snap fastener member 24 secured thereto and having a stud 26 for engagement in the socket in a fastener member 28 secured to the inner end of the tape section 2*ac*, to secure detachably one of the outer ends of the tape section 2*ad* to the inner end of the tape section 2*ac*. The tape section 2*ad* is provided at its other end with a snap fastener member 30 secured thereto and provided with a stud 32 for engagement in the socket in a cooperating fastener member 34 secured to the inner end of the member 2*ab* to attach the other outer end of the tape section 2*ad* detachably to the inner end of the tape section 2*ab*.

The tape section 2*ac* is provided with a snap fastener member 36 secured to the inner end thereof and provided with a stud 38 for engagement in the socket in the snap fastener member 34 to secure the inner ends of the tape sections 2*ac* and 2*ab* detachably together under certain conditions hereinafter set forth.

When the tape construction shown in FIGS. 3, 4 and 5 is to be used in laying out a croquet court of the greater length, the tape section 2*ad* is secured at its outer ends by the snap fasteners above described to the inner ends of the tape sections 2*ab* and 2*ac* to form a longitudinal tape member of the greater length. The tape construction shown in these figures is then used in substantially the same manner as the tape construction shown in FIG. 1 in laying out a corquet court.

Figure 7:
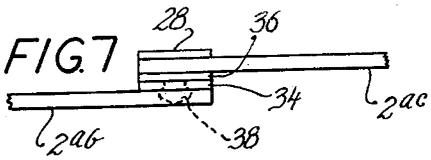
FIG. 7 is a detail view in front elevation on a corresponding scale, illustrating certain of the parts of the construction shown in FIGS. 3, 4 and 5 with the parts connected as shown in FIG. 5.

When the tape construction shown in FIGS. 3, 4 and 5 is to be used in laying a court of the lesser length, the tape section 2*ad* is removed from between the tape sections 2*ab* and 2*ac* and the tape sections 2*ab* and 2*ac* are placed relatively with their inner ends in overlapping relations and are secured together by the snap fastener elements carried respectively thereby as shown in FIGS. 5 and 7 to form a longitudinal tape member of the lesser length as shown in FIG. 5. The tape construction shown in this figure is then used in substantially the same manner as the tape construction shown in FIGS. 3 and 4 in laying out the court of lesser length.

Upon the completion of the laying out of a croquet court in the manner set forth in the above description by means of the present layout tape construction, the said tape construction is permanently removed from the court. The tape construction may be quickly and easily removed from the court by first raising the rings 4 to disengage them from the stakes and then drawing the tape construction longitudinally through the properly located wickets along the center line of the court.

It is to be understood that except as defined in the claim, the invention is not limited to the particular construction of the illustrated embodiments of the invention but that these embodiments are merely illustrations of the invention and that the invention may be embodied in other forms within the scope of the claim.

Having explained the nature and object of the invention and having specifically described constructions embodying the invention in its preferred forms, what is claimed is:

A tape construction for use in laying out croquet courts, comprising a longitudinal tape adapted to be positioned along the longitudinal center line of a croquet court, two rings attached respectively to the ends of said longitudinal tape which rings are at the predetermined distance apart proposed for the length of the court between stakes and which rings are of such size that they are adapted for the passage of croquet stakes therethrough, marks on said tape spaced longitudinally for indicating the required longitudinally spaced positions of the wickets required to be located along the center line of the court, two similar snap connection elements on the longitudinal tape spaced at equal predetermined distances from the ends of said longitudinal tape, a transverse tape having at one end thereof a snap connection element adapted for snap engagement with either of said elements on the longitudinal tape, said transverse tape when its said element is engaged with either of the elements on the longitudinal tape being adapted to be extended from said longitudinal tape into a position at one side thereof and perpendicular to the center line thereof and said transverse tape being adapted to be pivotally moved from the first said position and relatively to the longitudinal tape so as to be extended into a second position at the opposite side of said longitudinal tape and perpendicular to said center line, and a mark on said transverse tape spaced a predetermined distance from said point of connection which mark in the successive positions of the transverse tape is adapted for successively indicating the required positions of two side wickets at opposite sides of the center line of the court.

References Cited in the file of this patent

UNITED STATES PATENTS

| | | |
|---|---|---|
| 464,205 | Swope | Dec. 1, 1891 |
| 1,240,498 | Sherwood | Sept. 18, 1917 |
| 2,458,984 | Engle | Jan. 11, 1949 |
| 2,806,286 | Weiner | Sept. 17, 1957 |

FOREIGN PATENTS

| | | |
|---|---|---|
| 2,213 | Great Britain | of 1889 |
| 387,476 | Germany | Dec. 28, 1923 |